(12) United States Patent
Yokoyama et al.

(10) Patent No.: US 6,177,069 B1
(45) Date of Patent: Jan. 23, 2001

(54) LAMINATED DEODORANT FILTER MEDIUM AND METHOD OF MAKING THE SAME

(75) Inventors: Takahiro Yokoyama; Tatsuo Nakamura; Satoshi Kumagai, all of Ibaraki (JP)

(73) Assignee: Japan Vilene Company, Ltd., Tokyo (JP)

( * ) Notice: Under 35 U.S.C. 154(b), the term of this patent shall be extended for 0 days.

(21) Appl. No.: 09/088,776

(22) Filed: Jun. 2, 1998

(30) Foreign Application Priority Data

Jun. 3, 1997 (JP) .................................................. 9-161955
Aug. 21, 1997 (JP) .................................................. 9-240404
Feb. 12, 1998 (JP) .................................................. 10-046215

(51) Int. Cl.$^7$ ........................................................ A61L 9/01
(52) U.S. Cl. ...................... 424/76.1; 424/76.2; 424/76.3; 424/76.4; 424/400; 424/402
(58) Field of Search ................................. 424/76.1, 76.2, 424/76.3, 76.4, 400, 402, 600, 604, 606

(56) References Cited

U.S. PATENT DOCUMENTS

| | | | |
|---|---|---|---|
| 4,061,807 | * 12/1977 | Shaler et al. | 428/36 |
| 4,510,193 | 4/1985 | Blücher et al. | 428/196 |
| 5,310,548 | * 5/1994 | Tsuru et al. | 424/76.3 |
| 5,486,410 | 1/1996 | Groeger et al. | 428/283 |
| 5,665,148 | 9/1997 | Mühlfeld et al. | 96/153 |

FOREIGN PATENT DOCUMENTS

| | | |
|---|---|---|
| 58-003622 | 1/1983 | (JP) . |
| 1-189314 | 7/1989 | (JP) . |
| 4-30025 | 3/1992 | (JP) . |
| 8-206497 | 8/1996 | (JP) . |
| 8-266845 | 10/1996 | (JP) . |
| 8-266846 | 10/1996 | (JP) . |
| 8-266847 | 10/1996 | (JP) . |
| 8-266849 | 10/1996 | (JP) . |
| 8-290055 | 11/1996 | (JP) . |
| 94/03270 | 2/1994 | (WO) . |

\* cited by examiner

*Primary Examiner*—S. Mark Clardy
*Assistant Examiner*—Kathryne E. Shelborne
(74) *Attorney, Agent, or Firm*—Morgan, Lewis & Bockius LLP

(57) ABSTRACT

A laminated deodorant filter medium is constituted by a plurality of laminate units laminated together; each of which includes a fiber web constituted by a connecting portion and a resin-aggregating portion, both of which are made of a hotmelt resin, and a deodorant particle firmly attached to one surface of the fiber web by way of the resin-aggregating portion. Employable as the deodorant particle is at least two kinds of deodorant particles including an acidic odor deodorant particle, an alkaline odor deodorant particle, and a physically adsorbing particle. As the resin-aggregating portion is formed at a part where a hotmelt nonwoven fabric and the deodorant particle are in contact with each other, the deodorant particle can be firmly attached to the fiber web as a single layer without using a binder, whereby a deodorant filter medium having a low pressure loss and high efficiency can be obtained.

15 Claims, 2 Drawing Sheets

LAMINATED DEODORANT FILTER MEDIUM AND METHOD OF MAKING THE SAME

BACKGROUND OF THE INVENTION

1. Field of the Invention

The present invention relates to a laminated deodorant filter medium and a method of making the same. In particular, it relates to a laminated deodorant filter medium, which is excellent in deodorizing performances and processability, used for purifying a fluid contaminated with odor components by filtration, for example, and a method of making the same.

2. Related Background Art

Recently, awareness of living environment has enhanced remarkably. In particular, there is a great interest in odor. Accordingly, it has conventionally been required that not only harmful materials but also unpleasant odoriferous materials be eliminated. In order to remove these odor components, various types of deodorant filter media have been proposed. Most of such deodorant filter media comprise a gas-permeable sheet member, and particles made of activated carbon or various kinds of chemical deodorants (hereinafter generically referred to as deodorant particle), for example, firmly attached to and carried by the sheet member.

Widely employed as a conventionally known technique for firmly attaching particles are processes using various kinds of binders to firmly attach deodorant particles to a base fabric made of a nonwoven or the like so that they are carried by the base fabric. Most of these processes have shortcomings in that, since the surface of deodorant particle is covered with the binder, the performances inherent in the particle may be deteriorated.

On the other hand, for example, in the technique proposed by Japanese Patent Application Laid-Open No. 8-266845, an emulsion type acrylic adhesive is applied beforehand to a net having a mesh size of 1 mm to 10 mm, and deodorant particles (adsorbent particles) are firmly attached to the net by way of the adhesive. In this technique, as disclosed in the above-mentioned publication, the net having a mesh size of 1 mm to 10 mm is coated with the adhesive by use of spray, coater, or the like. Accordingly, even if a net having a mesh size of 100 $\mu$m or less, for example, is chosen in order to achieve a desired deodorizing efficiency, the aperture portion of the net may be blocked at the adhesive application step, whereby the resulting filter medium may yield a higher pressure loss.

Known as another technique for firmly attaching particles is a process in which an adhesive made of a particulate thermoplastic resin and deodorant particles are mixed together beforehand, and the resulting mixture is applied to a sheet-shaped flexible support material, so as to yield a filter medium. While an adhesive having a particle size smaller than that of the deodorant particle is usually employed in thus configured deodorant filter medium, the deodorant particles can be mutually bonded together point by point in a three-dimensional fashion by way of binder particles, so as to constitute a three-dimensional structure with a predetermined thickness. Accordingly, as compared with the technique disclosed in the previously mentioned publication, a deodorant filter medium comprising deodorant particles with a higher density can be realized.

As explained in the foregoing, in the techniques using a particulate adhesive, deodorant particles and binder particles are mixed beforehand, and the resulting mixture is disposed at and firmly attached to a support material. Here, when one deodorant particle is taken into consideration, the degree of attachment thereof can be controlled when the particle size of binder particles and their relative composition ratio with respect to the deodorant particle are selected. The binder particle, however, merely holds the deodorant particles at their discrete points. Accordingly, as is well-known, the mechanical strength of binder particles is not high enough to effect bending processing of a filter element in order to materialize a highly efficient deodorant filter medium. Hence, in order to prevent the deodorant particles from dropping off, it has been necessary to limit the designing upon the bending processing. Also, in this point-bonding technique, the adhesive is needed to be hot-melted in order to attain sufficient attachment. Upon heat treatment, however, the adhesive is likely to fluidize so as to localize on the lower side in the direction of gravity. Consequently, it has been difficult to set the heat-treatment condition, whereby the pressure loss caused by the adhesive is likely to increase, or the deodorant particles may be covered with the fluidized adhesive.

Meanwhile, there are various kinds of deodorants used as deodorant particles. Activated carbon, which is the most prevailing, exhibits a relatively low specificity to odoriferous materials and has a function of physical adsorption. (Such a kind of deodorant particles will hereinafter be referred to as physically adsorbing particle.) In addition, with odoriferous materials being classified into those of acidic odor and alkaline odor, deodorant particles having chemical functions of capturing these odors by use of their respective charge states (hereinafter respectively referred to as acidic odor deodorant particle and alkaline odor deodorant particle according to odoriferous materials which can be neutralized thereby) have been known.

Known as a deodorant filter medium comprising two or more kinds of deodorant particles having different functions as such is a technique disclosed in Japanese Utility Model Application Laid-Open No. 4-30025, for example. This publication discloses a filter having a pleated structure in which a net-shaped porous sheet and another porous sheet overlap each other, with one of the sheets having a deodorizing function caused by a chemical reaction or catalytic action. It also discloses a filter having a pleated structure in which a net-shaped porous sheet and another porous sheet overlap each other, with one of the sheets containing a deodorizing adsorbent, while the other having a deodorizing function caused by a chemical reaction or catalytic action.

Figure 4:
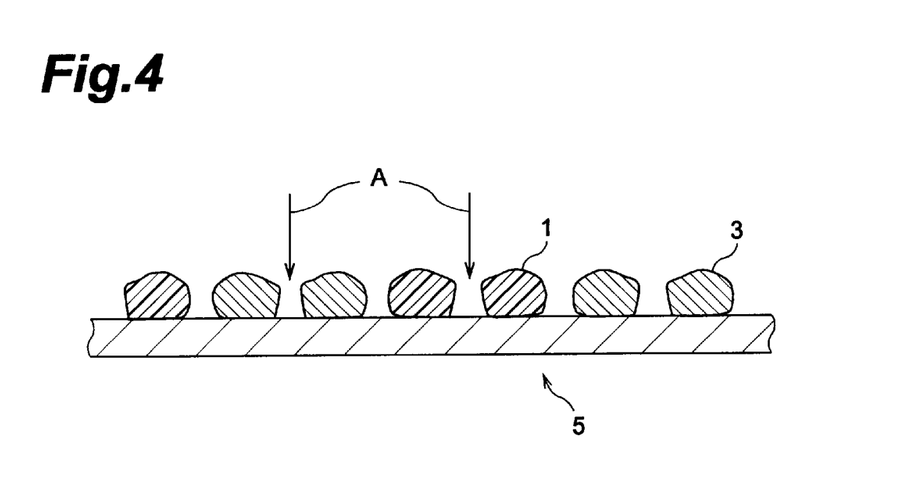
FIG. 4 is a schematic sectional view showing the cross section of a conventional deodorant filter medium.

The inventors have studied, in detail, deodorant filter media satisfying both pressure loss and deodorizing efficiency by using two or more kinds of deodorant particles having different functions. For example, for preparing a sheet-shaped deodorant filter medium by use of two kinds of deodorant particles, the simplest technique comprises the steps of uniformly mixing desired deodorant particles and then firmly attaching them to a gas-permeable cloth. When the pressure loss as the deodorant filter medium is taken into consideration, it is necessary that the deodorant particles be designed to have a predetermined particle size or greater. It has been found as a result of these empirical studies that, as can be understood from FIG. 4 that shows the cross section of a deodorant filter medium by its schematic cross section, the probability of first deodorant particles 1, which have a deodorizing function with respect to an odoriferous material, coming into contact with a flow of the odoriferous material indicated by arrow A substantially coincides with the ratio of the area occupied by the first deodorant particles 1 to the filter medium area (area through which the gas to be filtered can pass) of the filter medium 5. Accordingly, it has been found that, in the portion of the filter medium 5 occupied by second deodorant particles 3, the odoriferous material exhibits a phenomenon similar to leaking, thus making it difficult to efficiently effect deodorization in a structure in which two kinds of different deodorant particles are firmly attached into a single layer. In effect, it is quite difficult for two different kinds of deodorant particles to be firmly attached to and carried by a cloth such that one kind of the particles and the other kind of particles are completely adjacent to each other on the cloth surface.

Also, as described in the above-mentioned Japanese Utility Model Application Laid-Open No. 4-30025 as well, of materials having a chemically deodorizing function, those exhibiting this function upon neutralizing reactions have been known to include a number of deodorant materials which are deactivated when coming into contact with mutually-reacting materials such as acid and base. Accordingly, in a process where such deodorant particles which are likely to be deactivated come into contact with each other, the deodorizing performances to be exhibited may be inhibited.

For designing a deodorant filter medium with a pressure loss as low as possible, it will be effective if different kinds of deodorant particles are laminated layer by layer. Nevertheless, there has been no specific technique known for preventing the deodorant particles from being deactivated upon coming into contact with each other between the layers.

SUMMARY OF THE INVENTION

In view of the foregoing conventional problems, the inventors have diligently conducted studies in order to materialize a deodorant filter medium in which constituents for firmly attaching deodorant particles are disposed in a state continuous to each other, thereby yielding an excellent mechanical strength and containing the deodorant particles with a high density; and, as a result, have attained the present invention. Accordingly, it is an object of the present invention to provide a laminated deodorant filter medium having a low pressure loss, a high deodorizing efficiency, a high mechanical strength, and a high processing aptitude; and a method of making the same. It is another object of the present invention to provide a laminated deodorant filter medium comprising at least two kinds of deodorant particles having different functions, which is capable of achieving a high efficiency while keeping its pressure loss low; and a method of making the same.

One aspect of the present invention is a laminated deodorant filter medium comprising a plurality of laminate units laminated together; each of which comprises a fiber web constituted by a connecting portion and a resin-aggregating portion, both of which are made of a hotmelt resin, and a deodorant particle firmly attached to one surface of the fiber web by way of the resin-aggregating portion, wherein the other surface of one of the laminate units is firmly attached to the deodorant particle of another laminate unit by way of the resin-aggregating portion of the former laminate unit so that the former laminate unit is laminated with the latter laminate unit.

Another aspect of the present invention is a method of making a laminated deodorant filter medium comprising a first step of disposing deodorant particles at a surface of a hotmelt nonwoven fabric, then forming a resin-aggregating portion by heat treatment at a portion where the hotmelt nonwoven fabric and one of the deodorant particles are in contact with each other, and forming a fiber web constituted by the resin-aggregating portion and a connecting portion made of a hotmelt resin; a second step of leaving the deodorant particle only firmly attached to the fiber web within the disposed deodorant particles, so as to form a laminate unit; and a further step of laminating another hotmelt nonwoven fabric in contact with the deodorant particle of the laminate unit, subsequently disposing deodorant particles at a surface of this hotmelt nonwoven fabric, and then successively performing the first and second steps.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
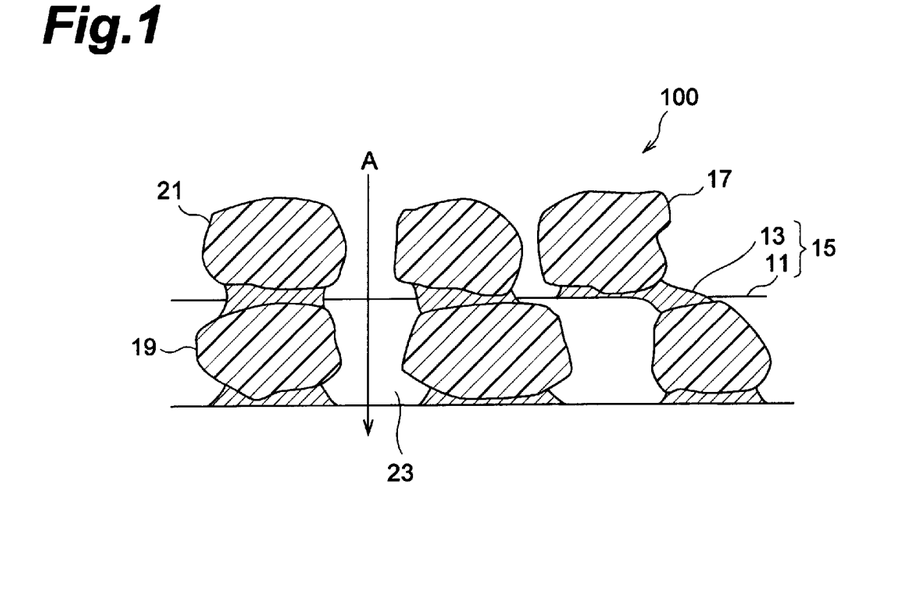
FIG. 1 is a schematic sectional view schematically showing the laminated deodorant filter medium in accordance with Embodiment 1 of the present invention.

With reference to the accompanying drawings, the laminated deodorant filter medium in accordance with an embodiment of the present invention will be explained. FIG. 1 is a schematic sectional view schematically showing the laminated deodorant filter medium in accordance with Embodiment 1 of the present invention. Among the drawings, numerals or letters identical to each other refer to parts identical or equivalent to each other.

In FIG. 1, a fiber web 15 comprises a connecting portion 11 and a resin-aggregating portion 13. As a deodorant particle 17 is firmly attached to one surface of the fiber web 15, a first laminate unit 19 is constituted. As a second laminate unit 21, which is another laminate unit, is firmly attached to the first laminate unit 19 by way of the deodorant particle 17, a laminated deodorant filter medium 100 is attained. Here, both the connecting portion 11 and resin-aggregating portion 13 are constituted by a hotmelt resin. The fiber web 15 is obtained when a hotmelt nonwoven fabric is heat-treated in contact with the deodorant particle 17 according to a manufacturing method which will be explained later.

As a hotmelt resin capable of forming such a fiber web, thermoplastic resins such as polyamide resin, polyester resin, polyurethane resin, polyolefin resin, and modified polyolefin resin may be used separately or as being mixed in combination. Examples of modified polyolefin resin here include ethylene/vinyl acetate copolymer, saponified product of ethylene/vinyl acetate copolymer, ethylene/ethylacrylate copolymer, ethylene/acrylic acid copolymer, ethylene/methacrylic acid copolymer, ethylene/maleic acid copolymer, ionomer resin (heat-sensitive resin in which a metal is added to ethylene/methacrylic acid copolymer), and the like.

As the hotmelt resin employable in the present invention, the one having a MI (melt index) or MFR (melt flow rate) of at least 50 but not greater than 500 is preferably selected. A resin having an MI lower than this preferable range has a lower fluidity upon heating so that the resin-aggregating portion is hard to form upon heat treatment, whereby attachment of deodorant particles may become incomplete. By contrast, a resin with an MI higher than the preferable range has a high fluidity upon heat treatment so that it becomes hard to maintain the form of laminate unit.

Though various kinds of conventionally known activated carbon and other particulate chemical deodorants can be selectively used as deodorant particles; in order to attain a high efficiency and low pressure loss, the average particle size of the particles is preferably at least 0.147 mm (100 mesh) but not greater than 1.65 mm (10 mesh). When deodorant particles with an average particle size finer than the lower limit of this preferable range is used, pressure loss increases, although the initial deodorizing efficiency can be set higher.

By contrast, when deodorant particles having an average particle size greater than the upper limit of the preferable range is used, the deodorizing efficiency tends to decrease. The amount of deodorant particles carried by a single laminate unit constituting the deodorant filter medium of the present invention approximately depends on the average particle size of the particles, whereby the deodorizing efficiency decreases when the particle size is relatively large. Nevertheless, when the number of laminate units is designed to be greater, the deodorizing efficiency required for the deodorant filter medium can be achieved. In this case, deodorant particles constituting the respective laminate units may have average particle sizes different from each other. In view of the processing adaptability of the deodorant filter medium, i.e., bending properties necessary for pleating processing, flexibility required upon winding up, and the like, the thickness of the filter medium is preferably set to 5 mm or less, more preferably about 1 to 4 mm.

In the following, the method of making a laminated deodorant filter medium in accordance with the present invention will be explained. As mentioned above, in the method of the present invention, heat treatment is effected in a state where hotmelt nonwoven fabrics are laminated while deodorant particles are disposed in contact therewith. The hotmelt nonwoven fabric used here is constituted by various kinds of resins mentioned above and preferably has a surface density of 10 to 30 g/m², more preferably of 15 to 25 g/m². When the surface density is lower than these preferable ranges, the nonwoven may lack its uniformity, whereby the uniformity of deodorant particles firmly attached to the laminate units may deteriorate, thus lowering the efficiency of the deodorant filter medium due to leakage of odoriferous materials. Also, beyond the preferable range, the attachment strength cannot be expected to improve, whereas only the pressure loss as the deodorant filter medium would increase.

In order for the resulting deodorant filter medium to uniformly carry deodorant particles, the aperture size of the hotmelt nonwoven fabric used in the present invention is preferably smaller than the desired particle size of the particles. For example, in the case where the particle size of deodorant particles is about 500 µm (about 32 mesh), the hotmelt nonwoven fabric is preferably selected such that the web aperture diameter after heat treatment becomes 100 µm or less.

Figure 2:
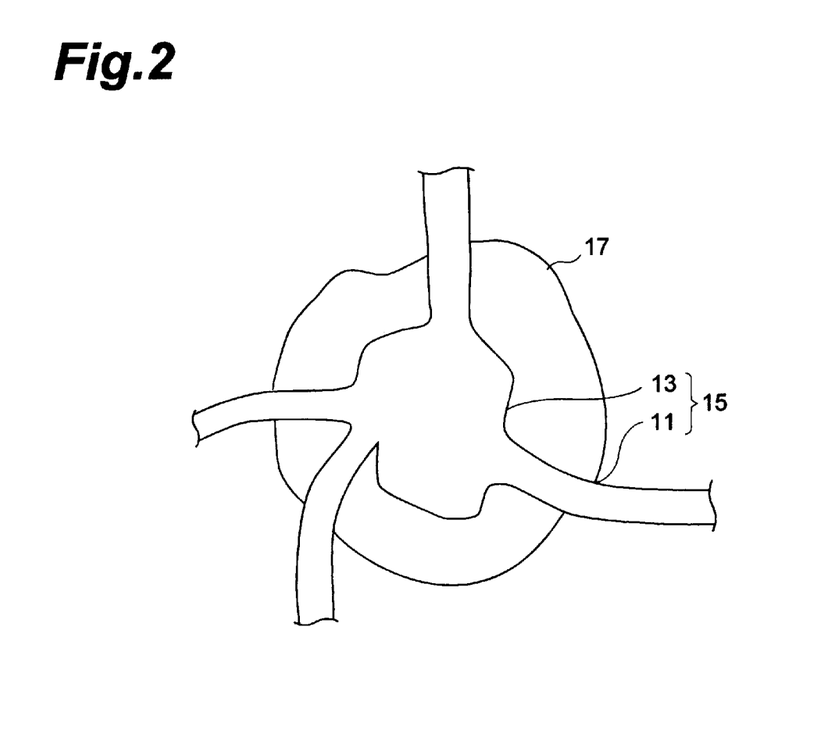
FIG. 2 is a schematic enlarged view showing a resin-aggregating portion.

In the method in accordance with the present invention, it is presumed that the fibers constituting the hotmelt nonwoven fabric are plasticized and melted upon heat treatment, and a part thereof, due to their thin fiber diameter, are cut off upon melting and aggregate at the junction with the deodorant particle, thereby forming the resin-aggregating portion 13. Referring to FIG. 2 which indicates a plane particularly illustrating one deodorant particle 17 from the side of the web 15 in the laminate units 19 and 21 shown in FIG. 1, while the resin-aggregating portion 13 is formed as mentioned above, the fibers having a relatively large fiber diameter would not be cut off when plasticized and melted, thus constituting a firm network structure as the connecting portion 11.

For this heat treatment, various kinds of known means such as calender, hot-air heater, infrared heater, heating by steam, apparatus heating a cloth held between a pair of opposing endless belts, and the like can be used. Among them, when heat treatment is effected with a fluid having a heat quantity, a communicating hole 23 (indicated by arrow A in FIG. 1) extending in the thickness direction of the second and first laminate units 21 and 19 can be formed.

Further, as a particularly preferable mode, when a hotmelt nonwoven fabric made of a thermoplastic polyamide resin or ethylene/vinyl acetate copolymer resin is used, and heat treatment with steam is employed, the above-mentioned cutting operation can be performed efficiently since this resin has such a characteristic as to be easily contracted and cut off upon wet heating. When the decrease in strength of the hotmelt nonwoven fabric due to its plasticizing and melting is needed to be compensated for, a dust-collecting filter material may be additionally used as a support for the hotmelt nonwoven fabric constituting the outermost layer of the deodorant filter medium.

Further, as another embodiment of the manufacturing method in accordance with the present invention, for example, in the case where a processing method, such as calender, other than fluid heating is employed, the deodorant filter medium in accordance with Embodiment 1 can also be obtained by a process comprising the steps of spreading deodorant particles on a release paper sheet, laminating a hotmelt nonwoven fabric thereon, overlaying another release paper sheet thereon, heat-treating thus obtained laminate, and successively forming laminate units.

Figure 3:
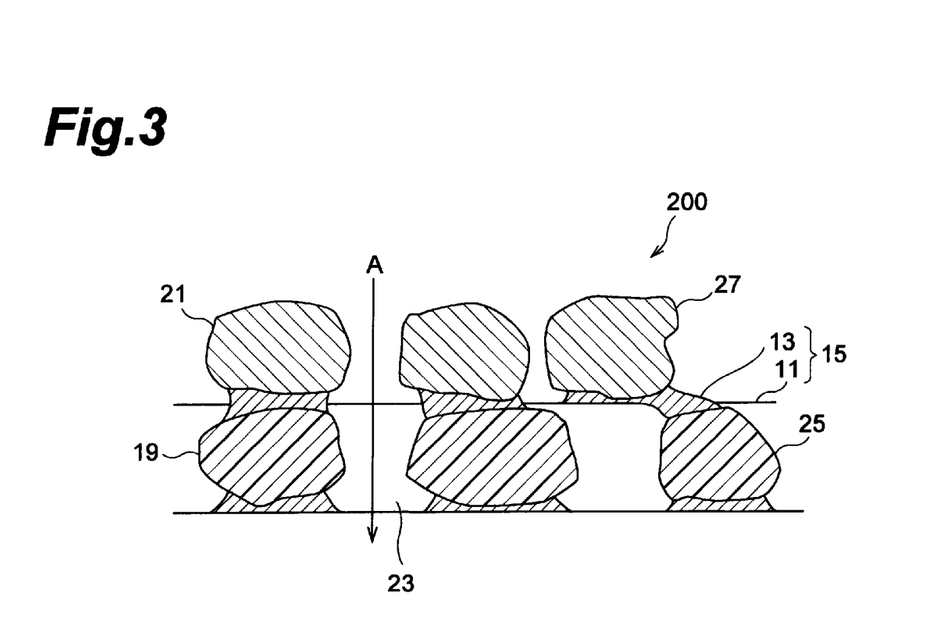
FIG. 3 is a schematic sectional view showing the laminated deodorant filter medium in accordance with Embodiment 2 of the present invention.

FIG. 3 is a schematic sectional view showing the laminated deodorant filter medium in accordance with Embodiment 2 of the present invention. In this drawing, a fiber web 15 constituting the deodorant filter medium of the present invention is constituted by a connecting portion 11 and a resin-aggregating portion 13, both of which are made of a hotmelt resin. First and second deodorant particles 25 and 27 are firmly attached to the first and second laminate units 19 and 21, respectively, unit by unit in an independent fashion. Also, the first and second deodorant particles 25 and 27 are firmly attached to and carried by the first and second laminate units 19 and 21 by way of the resin-aggregating portion 13, respectively, in a state not in contact with each other, there by constituting a laminated deodorant filter medium 200. As such a configuration is employed, when an odoriferous material such as that indicated by arrow A in this drawing passes through the communication hole 23 of the filter medium, it successively comes into contact with both of the second deodorant particle 27 and first deodorant particle 25 that are separated from each other and are prevented from being deactivated. Accordingly, in the state where pressure loss is very low, an efficient deodorizing effect can be obtained.

As the first and second deodorant particles, various kinds of deodorant particles which are likely to be deactivated when in contact with each other can be used in combination. For example, an acidic odor deodorant particle and an alkaline odor deodorant particle can be used in combination. Employable as these deodorant particles are not only granules mainly composed of a chemical deodorant which directly acts on odor, but also so-called impregnated carbon in which a chemical deodorant is attached to the surface of a particle exhibiting a function of physical adsorption such as activated carbon or zeolite preferably having a specific surface area of 100 $m^2/g$ or greater. In particular, the deodorant particles constituted by impregnation is optimal for the case where the chemical deodorant exhibits deliquescence.

Preferable as the chemical deodorant constituting an acidic odor deodorant particle are alkali metal carbonates such as potassium carbonate, potassium hydrogencarbonate, sodium carbonate, and sodium hydrogencarbonate; and amine compounds such as ethanolamine, hexamethylenediamine, and piperazine. Employable as the chemical deodorant constituting an alkaline odor deodorant particle are phosphoric acid, sulfuric acid, nitric acid, malic acid, citric acid, ascorbic acid, and the like.

The deodorant particles employable in the present invention should not be restricted to the combination of those mentioned above. For example, particles selected from three kinds of deodorant particles including those exhibiting the above-mentioned function of physical adsorption may be firmly attached to their respective laminate units, which are laminated together. Further, though the particles having physical and chemical deodorizing functions are exemplified above, deodorant particles having catalytic actions such as titanium oxide, phthalocyanine, and platinum may be used as well.

While various kinds of known deodorant particles can be used as such; in order to attain a filter material having a low pressure loss and high efficiency, as with Embodiment 1, the average particle size of the particles is preferably at least 0.147 mm (100 mesh) but not greater than 1.65 mm (10 mesh). When deodorant particles with an average particle size finer than the lower limit of this preferable range is used, pressure loss increases, although the initial deodorizing efficiency can beset higher. By contrast, when deodorant particles having an average particle size greater than the upper limit of the preferable range is used, the deodorizing efficiency tends to decrease.

In the following, examples of the present invention will be explained. The following examples are merely preferable examples for facilitating the understanding of the present invention. The present invention should not be restricted by these exemplified conditions alone.

EXAMPLES 1 TO 11 AND COMPARATIVE EXAMPLE 1

First, a spun bond made of polyester having a surface density of 30 $g/m^2$ was used as a support, and a hotmelt nonwoven fabric made of a thermoplastic polyamide resin having a surface density of 20 $g/m^2$ was laminated on the support. On the surface of thus laminated hotmelt nonwoven fabric, classified commercial activated carbon (which will be explained later in detail) was spread. Subsequently, steam processing at about 5 $kg/cm^2$ was performed for about 7 seconds from the support side (hotmelt nonwoven fabric side), so that the hotmelt nonwoven fabric was plasticized and melted, whereby activated carbon was firmly attached to a web constituted by a connecting portion made of a hotmelt resin and a resin-aggregating portion by way of the resin-aggregating portion. Then, the activated carbon particles other than those firmly attached were removed, thus yielding a first layer of laminate unit, to which the activated carbon particles were firmly attached according to their particle size, bonded to the support. Another sheet of the above-mentioned hotmelt nonwoven fabric was laminated on the laminate unit in this state, and through spreading of activated carbon, steam processing, and removal of unattached activated carbon particles, the second to third laminate unit was formed, thus yielding deodorant filter media in accordance with Examples 1 to 5. Also, using the constituent materials identical to those of Example 2 except for hotmelt nonwoven fabrics made of hotmelt resins other than the thermoplastic polyamide resin, deodorant filter media in accordance with Examples 6 to 10 were prepared. Further, the deodorant filter medium obtained by Example 2 was held between a pair of opposing endless belts and heat-pressed for 10 seconds at a temperature of 130° C. and a pressure of 0.01 MPa, so as to yield a filter medium as Example 11.

For comparison, 25 parts by weight of VESTAMELT-430P2 (product name, manufactured by Daicel-Huls Ltd., average particle size: 0.16 mm), a particulate polyamide adhesive, were mixed with 100 parts by weight of activated carbon having an average particle size of 0.375 mm in a dry state; the resulting mixture was coated on a support made of the above-mentioned polyester spun bond; and then the coating was heated at 150° C. for 5 minutes, thereby preparing a deodorant filter medium in accordance with Comparative Example 1 in which the activated carbon particles were bonded to each other point by point by the above-mentioned adhesive.

Table 1 shows details of the individual filter media in accordance with Examples 1 to 11 and Comparative Example 1, whereas Table 2 shows their results of measurement of pressure loss, measurement of deodorizing efficiency, and processability.

TABLE 1

|  | RESIN CONSTITUTING HOTMELT NONWOVEN FABRIC | MI | NUMBER OF LAMINATE UNITS | AVERAGE PARTICLE SIZE OF DEODORANT PARTICLES (mm) | CARRIED AMOUNT OF DEODORANT PARTICLES (g/m$^2$) | DEODORANT FILTER MEDIUM THICKNESS (mm) |
|---|---|---|---|---|---|---|
| EXAMPLE 1 | POLYAMIDE | 80 | 2 | 0.264 | 174 | 1.00 |
| EXAMPLE 2 | POLYAMIDE | 80 | 2 | 0.375 | 278 | 1.32 |
| EXAMPLE 3 | POLYAMIDE | 80 | 2 | 0.570 | 356 | 1.75 |
| EXAMPLE 4 | POLYAMIDE | 80 | 2 | 1.260 | 857 | 3.59 |
| EXAMPLE 5 | POLYAMIDE | 80 | 3 | 0.375 | 440 | 1.75 |

TABLE 1-continued

|  | RESIN CONSTITUTING HOTMELT NONWOVEN FABRIC | MI | NUMBER OF LAMINATE UNITS | AVERAGE PARTICLE SIZE OF DEODORANT PARTICLES (mm) | CARRIED AMOUNT OF DEODORANT PARTICLES (g/m²) | DEODORANT FILTER MEDIUM THICKNESS (mm) |
|---|---|---|---|---|---|---|
| EXAMPLE 6 | ETHYLENE/ VINYL ACETATE COPOLYMER | 150 | 2 | 0.375 | 280 | 1.34 |
| EXAMPLE 7 | ETHYLENE/VINYL ACETATE COPOLYMER SAPONIFIED PRODUCT | 170 | 2 | 0.375 | 279 | 1.33 |
| EXAMPLE 8 | ETHYLENE/ METHACRYLIC ACID COPOLYMER | 500 | 2 | 0.375 | 277 | 1.32 |
| EXAMPLE 9 | THERMOPLASTIC POLYESTER | 100 | 2 | 0.375 | 278 | 1.33 |
| EXAMPLE 10 | THERMOPLASTIC POLYURETHANE | 100 | 2 | 0.375 | 277 | 1.33 |
| EXAMPLE 11 | POLYAMIDE | 80 | 2 | 0.375 | 278 | 1.00 |
| COMPARATIVE EXAMPLE 1 | NONE | — | — | 0.375 | 440 | 1.78 |

TABLE 2

|  | PRESSURE LOSS (Pa) | DEODORIZING EFFICIENCY (%) | | | | PROCESSABILITY |
|---|---|---|---|---|---|---|
|  |  | INITIAL | AFTER 10 min | AFTER 20 min | AFTER 30 min |  |
| EXAMPLE 1 | 9 | 97.7 | 97.4 | 93.7 | 87.9 | ○ |
| EXAMPLE 2 | 6 | 96.8 | 96.4 | 94.6 | 94.4 | ○ |
| EXAMPLE 3 | 5 | 94.3 | 94.0 | 92.7 | 91.8 | ○ |
| EXAMPLE 4 | 4 | 91.5 | 89.7 | 90.1 | 89.6 | ○ |
| EXAMPLE 5 | 9 | 99.1 | 99.0 | 98.8 | 98.5 | ○ |
| EXAMPLE 6 | 6 | 96.8 | 96.4 | 94.6 | 94.4 | ○ |
| EXAMPLE 7 | 6 | 96.8 | 96.4 | 94.6 | 94.4 | ○ |
| EXAMPLE 8 | 6 | 96.7 | 96.5 | 94.5 | 94.3 | ○ |
| EXAMPLE 9 | 6 | 96.8 | 96.4 | 94.6 | 94.4 | ○ |
| EXAMPLE 10 | 6 | 96.6 | 96.3 | 94.5 | 94.3 | ○ |
| EXAMPLE 11 | 7 | — | — | — | — | ○ |
| COMPARATIVE EXAMPLE 1 | 14 | 96.5 | 96.3 | 95.9 | 94.2 | x |

In the following, the method of measuring deodorizing properties will be explained. First, for measuring pressure loss, according to a conventional method, air was blown to each deodorant filter medium at a velocity of 10 cm/sec, and the pressure difference between the upstream and downstream of the filter medium was determined. Consequently, as can be seen from the comparison between Comparative Example 1 constituted by the particulate adhesive and Example 5, remarkable results were observed in that the pressure loss in the filter media employing the present invention was about ⅔ that in Comparative Example 1, although they were constituted by substantially the same amount and same average particle size of deodorant particles. Also, it can be seen that the filter media in accordance with Examples 1 to 11 to which the present invention was applied yield a low pressure loss. Further, when the filter medium in accordance with Comparative Example 1 was observed with the naked eye, film-like portions supposed to have been caused by the particulate adhesive were found to be scattered on the surface of the filter medium on the support side.

The deodorizing efficiency was measured using toluene as an odoriferous material at an initial concentration of 25 ppm and a velocity of 14 cm/sec. In this measurement, the point of time at 1 minute after starting the measurement was defined as its initial stage where the test condition was supposed to have reached a steady state. Then, the measurement was performed every 10 minutes till 30 minutes elapsed. The difference between the initial concentration (upstream concentration) and the downstream concentration after passing through the filter medium was divided by the initial concentration, and the results were expressed in terms of percentage. As can be seen from Table 2, the structural superiority caused by the adaptation of the present invention was confirmed from the comparison between Example 5 and Comparative Example 1. When the filter medium of Comparative Example 1 was observed with an electron microscope, part of the activated carbon surface was found to have been covered with components which were supposed to be the portion of adhesive not contributing to attachment. The results of Examples 1 to 10 indicate that the initial characteristic was better as the average particle size of the deodorant particles was smaller. Though not shown in Table 2, the measured results of deodorizing efficiency in the filter medium in accordance with Example 11 were substantially the same as those in Example 2, thus indicating that, as it was manufactured through two kinds of heating means, the thickness was allowed to decrease (processability to improve), and excellent deodorizing performances were exhibited without greatly increasing pressure loss.

Further, when each of the above-mentioned filter media was subjected to pleating processing at an angle of 90°, no substantial damage was found at the bent portion in each of the 11 kinds of filter media in accordance with Examples, whereas the filter medium in accordance with Comparative Example 1 generated a crack which was discernible with the naked eye and dropped off part of the deodorant particles.

As can be understood from the foregoing explanations, each of the filter media in accordance with Examples employing the present invention was excellent in both deodorizing efficiency and pressure loss, and exhibited favorable processability. While the technique using a particulate adhesive listed as Comparative Example 1 contained the adhesive by about 19% of the weight of filter medium, it was about 11% in Example 5 carrying substantially the same amount of deodorant particles. As a consequence, it has been found that, when firmly attaching the deodorant particles, the technique in accordance with the present invention using a hotmelt nonwoven fabric can minimize the ratio of constituent which does not contribute to deodorization without damaging processability, thus making it possible to attain a high deodorizing efficiency and low pressure loss.

EXAMPLE 12

First, as Example 12, the method of preparing a laminated deodorant filter medium will be explained. To begin with, a spun bond made of polyester having a surface density of 30 g/m$^2$ was used as a support, and a hotmelt nonwoven fabric made of a thermoplastic polyamide resin having a surface density of 20 g/m$^2$ was laminated on the support. On the surface of thus laminated hotmelt nonwoven, commercial activated carbon (having an average particle size of 0.375 mm) classified into the range of 32 to 60 mesh was spread as a first kind of deodorant particles. Subsequently, steam processing at about 5 kg /cm$^2$ was performed for about 7 seconds from the support side, so that the hotmelt nonwoven fabric was plasticized and melted, whereby activated carbon was firmly attached to a web constituted by a connecting portion made of a hotmelt resin and a resin-aggregating portion by way of the resin-aggregating portion. Then, the activated carbon particles other than those firmly attached were removed, thus yielding a first layer of laminate unit bonded to the support. Further, another sheet of the above-mentioned hotmelt nonwoven fabric was laminated on the activated-carbon-attached surface of the laminate unit in this state, and through spreading of 10 mass % phosphoric-acid-impregnated carbon which was an alkaline odor deodorant particle, heating, and removal of unattached activated carbon particles, the second laminate unit was formed, thus yielding the deodorant filter medium in accordance with Example 12. The impregnated carbon used in Example 12 was obtained when 10 parts by weight of phosphoric acid and 50 parts by weight of water were added to 100 parts by weight of the above-mentioned activated carbon, mixed uniformly, and then dried.

EXAMPLE 13

In a manner similar to Example 12, the laminated deodorant filter medium in accordance with Example 13 was prepared as a two-layer structure in which 10 mass % phosphoric-acid-impregnated carbon used in Example 12, as the first kind of deodorant particles, and 10 mass % potassium-carbonate-impregnated carbon, as the second kind of deodorant particles, were firmly attached to the respective laminate units in an independent fashion.

COMPARATIVE EXAMPLE 2

In order to prepare Comparative Example 2 corresponding to Example 12, activated carbon and 10 mass % phosphoric-acid-impregnated carbon were uniformly mixed together as a combination of different kinds of deodorant particles and were firmly attached in the mixed state to each of laminate units, which were laminated in two layers.

COMPARATIVE EXAMPLE 3

As Comparative Example 3 corresponding to Example 13, prepared was a deodorant filter medium having a two-layer structure in which each laminate unit was constituted by deodorant particles comprising a mixture of 10 mass % phosphoric-acid-impregnated carbon and 10 mass % potassium-carbonate-impregnated carbon as a combination of different kinds of deodorant particles in a manner similar to Comparative Example 2.

Deodorizing Test

For each of the above-mentioned four kinds of deodorant filter media, deodorizing efficiency was measured using ammonia, an alkaline odoriferous material, as an odoriferous material at an initial concentration of 25 ppm and a flow rate of 14 cm/sec for passing through the filter medium. In this measurement, the test condition was assumed to have reached its steady state 1 minute after starting the measurement, and the ammonia concentration downstream the filter medium was determined by a gas detecting tube at this point of time. The concentration (ppm) measured on the downstream side was divided by the upstream concentration (25 ppm), the result was subtracted from 1, and thus obtained value was multiplied by 100 to yield a removal ratio, which was defined as deodorizing efficiency. Table 3 shows thus attained results together with the constitutions of laminate units.

TABLE 3

| | ONE LAMINATE UNIT CONSTITUTION | OTHER LAMINATE UNIT CONSTITUTION | DEODORIZING EFFICIENCY (%) |
|---|---|---|---|
| EXAMPLE 12 | ACTIVATED CARBON | PHOSPHORIC-ACID-IMPREGNATED CARBON | 84 |
| EXAMPLE 13 | POTASSIUM-CARBONATE-IMPREGNATED CARBON | PHOSPHORIC-ACID-IMPREGNATED CARBON | 82 |
| COMPARATIVE EXAMPLE 2 | ACTIVATED CARBON + PHOSPHORIC-ACID-IMPREGNATED CARBON | ACTIVATED CARBON + PHOSPHORIC-ACID-IMPREGNATED CARBON | 73 |
| COMPARATIVE EXAMPLE 3 | PHOSPHORIC-ACID-IMPREGNATED CARBON + POTASSIUM-CARBONATE-IMPREGNATED CARBON | PHOSPHORIC-ACID-IMPREGNATED CARBON + POTASSIUM-CARBONATE-IMPREGNATED CARBON | 52 |

In the above-mentioned four kinds of deodorant filter media, substantially the same weight of deodorant particles are firmly attached. First, when Example 12 and Comparative Example 2 are compared with each other, it can be understood that the decrease in deodorizing efficiency caused by two kinds of deodorant particles carried within a single laminate unit (Comparative Example 2) can be improved by 10% or more in accordance with the present invention. Also, the difference between Example 13 and Comparative Example 3 indicates that the configuration of the present invention is quite effective. Namely, in the configuration of Example 13 in which only one kind of deodorant material was firmly attached to and carried by one laminate unit, the deodorizing efficiency was improved to at least 1.5 times that of the case employing the configuration of Comparative Example 3 in which two kinds of easily deactivating deodorant materials were mixed in each laminate unit.

These four kinds of deodorant filter media including Comparative Examples 2 and 3, which were obtained according to the above-mentioned techniques proposed by the assignee, yielded a low pressure loss of about 4 Pa (measured at a face velocity of 10 cm/sec). From these results, it has been elucidated that Examples 12 and 13 employing the present invention are quite effective due to the fact that, when at least two kinds of different deodorant particles are to be employed in a deodorant filter medium, the respective kinds of deodorant particles are firmly attached to discrete filter units, which are laminated together.

Though planar filter media are exemplified in the foregoing, the laminated deodorant filter medium in accordance with the present invention may be pleated to materialize an excellent deodorant filter unit. Also, while the cases equipped with two laminate units are exemplified, similar effects can be expected in the case constituted by three or more laminate units in order to include three or more kinds of deodorant particles.

As can be seen from the foregoing explanations, a deodorant filter medium in which deodorant particles are firmly attached to a web, which is a continuous constituent, can be attained in accordance with the present invention. Namely, as a resin-aggregating portion is formed at a part where a hotmelt nonwoven fabric and a deodorant particle are in contact with each other, the deodorant particles can be firmly attached to the fiber web as a single layer without using a binder, thus yielding a deodorant filter medium exhibiting a low pressure loss and high efficiency. Accordingly, a deodorant filter medium exhibiting a high efficiency, low pressure loss, and excellent processability can be provided. Also, an excellent deodorant filter medium comprising at least two kinds of deodorant particles with different functions and exhibiting a low pressure loss and high efficiency can be realized and provided.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A laminated deodorant filter medium comprising a plurality of laminate units laminated together; each of said laminate units comprising:
    a fiber web constituted by a connecting portion and a resin-aggregating portion, both of which are made of a hotmelt resin; and
    a deodorant particle firmly attached to one surface of said fiber web by way of said resin-aggregating portion,
    wherein the other surface of one of said laminate units is firmly attached to the deodorant particle of another laminate unit by way of the resin-aggregating portion of the former laminate unit so that the former laminate unit is laminated with the latter laminate unit.

2. A laminated deodorant filter medium according to claim 1, wherein said plurality of laminate units carry an identical kind of deodorant particle.

3. A laminated deodorant filter medium according to claim 1, wherein one of said plurality of laminate unit carries a single kind of deodorant particle, and wherein said laminated deodorant filter medium carries at least two kinds of deodorant particles.

4. A laminated deodorant filter medium according to claim 3, wherein said at least two kinds of deodorant particles include an acidic odor deodorant particle and an alkaline odor deodorant particle.

5. A laminated deodorant filter medium according to claim 3, wherein said at least two kinds of deodorant particles include an acidic odor deodorant particle and a physically adsorbing particle.

6. A laminated deodorant filter medium according to claim 3, wherein said at least two kinds of deodorant particles include an alkaline odor deodorant particle and a physically adsorbing particle.

7. A laminated deodorant filter medium according to claim 3, wherein said at least two kinds of deodorant particles include an acidic odor deodorant particle, an alkaline odor deodorant particle, and a physically adsorbing particle.

8. A laminated deodorant filter medium according to claim 7, wherein a laminate unit carrying said acidic odor deodorant particle and a laminate unit carrying said alkaline odor deodorant particle hold therebetween a laminate unit carrying said physically adsorbing particle.

9. A laminated deodorant filter medium according to claim 4, wherein said acidic odor deodorant particle is at least one selected from the group consisting of potassium carbonate, potassium hydrogencarbonate, sodium carbonate, sodium hydrogencarbonate, ethanolamine, hexamethylenediamine, and piperazine.

10. A laminated deodorant filter medium according to claim 4, wherein said alkaline odor deodorant particle is at least one selected from the group consisting of phosphoric acid, sulfuric acid, nitric acid, malic acid, citric acid, and ascorbic acid.

11. A laminated deodorant filter medium according to claim 5, wherein said physically adsorbing particle is at least one selected from the group consisting of activated carbon, zeolite, and impregnated carbon.

12. A laminated deodorant filter medium according to claim 1, wherein said hotmelt resin is at least one of thermoplastic resin selected from the group consisting of polyamide resin, polyester resin, polyurethane resin, polyolefin resin, and modified polyolefin resin.

13. A laminated deodorant filter medium according to claim 1, wherein said deodorant particle has an average particle size of 0.147 to 1.65 mm.

14. A method of making a laminated deodorant filter medium comprising:

a first step of disposing deodorant particles at a surface of a hotmelt nonwoven fabric, then forming a resin-aggregating portion by heat treatment at a portion where said hotmelt nonwoven fabric and one of said deodorant particles are in contact with each other, and forming a connecting portion made of a hotmelt resin, so as to form a fiber web comprising said resin-aggregating portion and said connecting portion;

a second step of leaving the deodorant particle only firmly attached to said fiber web within the disposed deodorant particles, so as to form a laminate unit; and a further step of laminating another hotmelt nonwoven fabric in contact with said deodorant particle of said laminate unit, subsequently disposing deodorant particles at a surface of said another hotmelt nonwoven fabric, and then successively performing said first and second steps.

15. A method of making a laminated deodorant filter medium according to claim 14, wherein said heat treatment in said first step is steam processing.

* * * * *